May 15, 1934. S. P. MILLER 1,958,586
METHOD OF DISSOLVING AND APPARATUS THEREFOR
Filed July 23, 1930 3 Sheets-Sheet 1
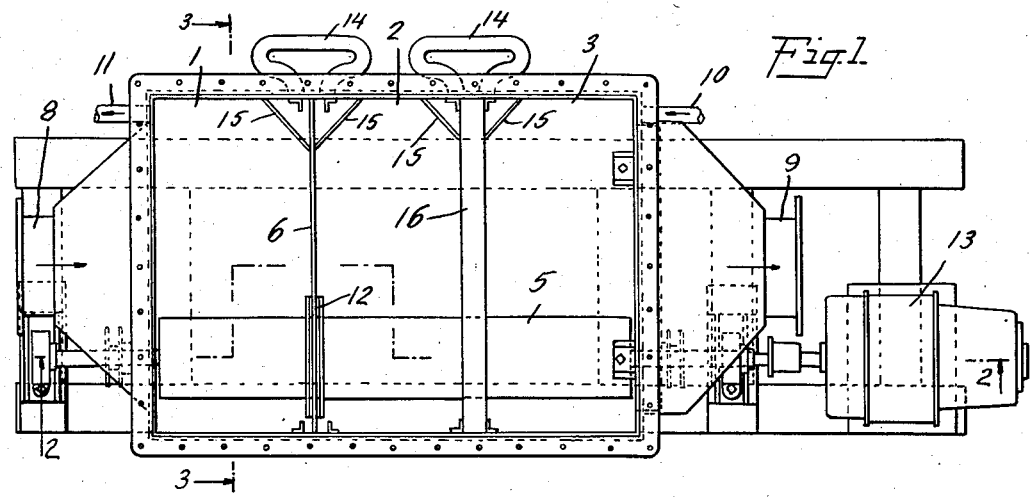
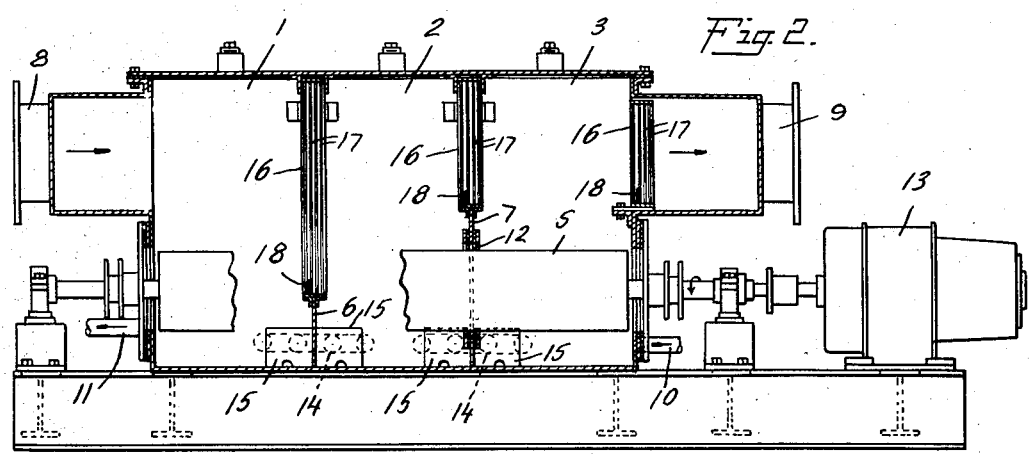
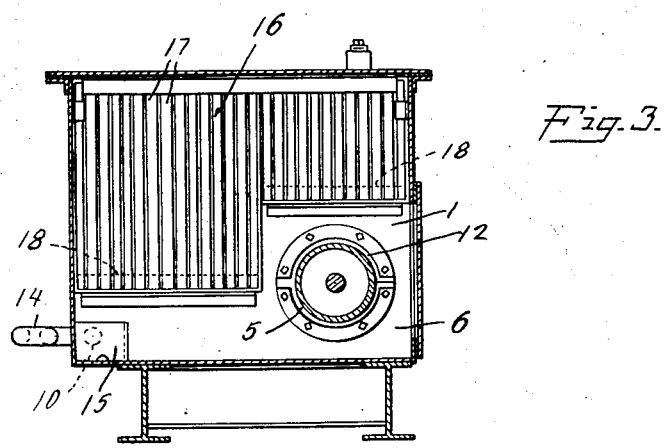
INVENTOR
S. P. Miller
BY
ATTORNEYS May 15, 1934. S. P. MILLER 1,958,586
METHOD OF DISSOLVING AND APPARATUS THEREFOR
Filed July 23, 1930   3 Sheets-Sheet 2
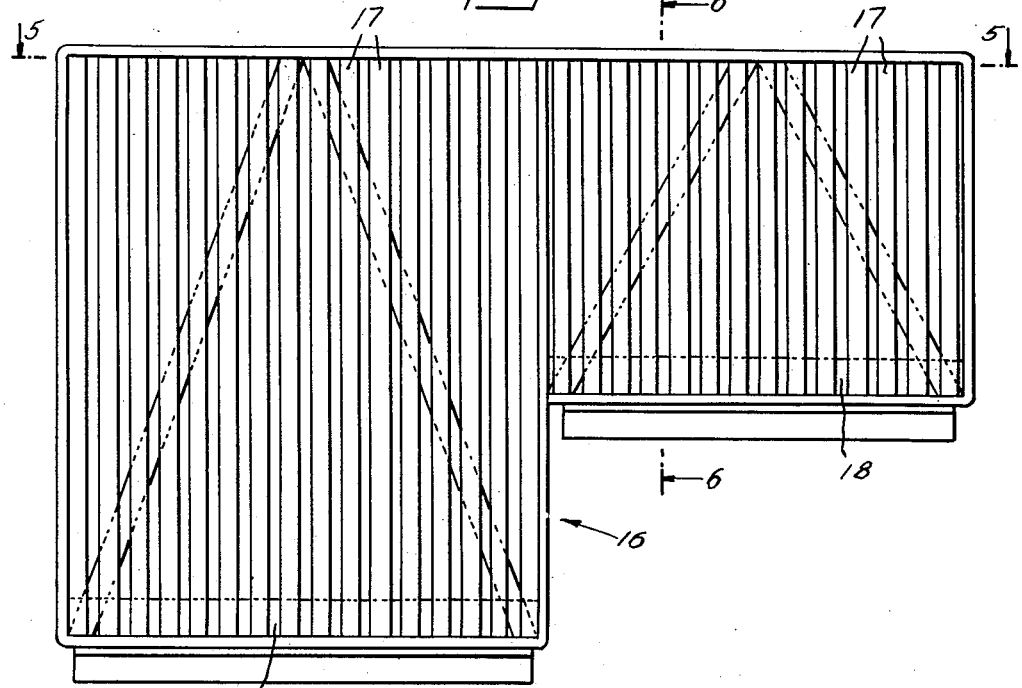
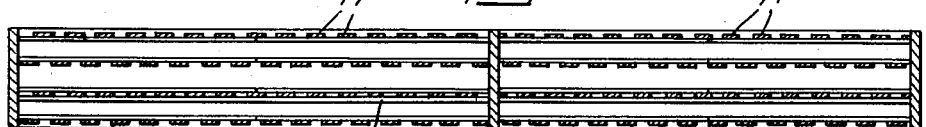
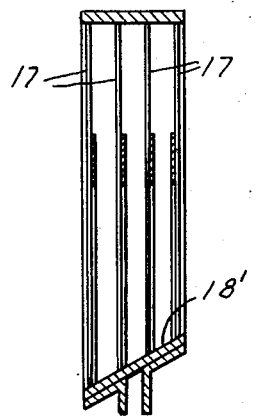
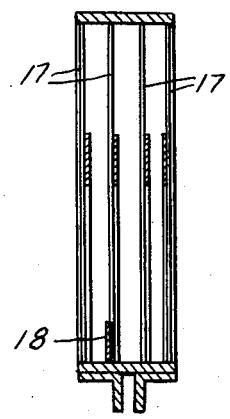
INVENTOR
S. P. Miller
BY
ATTORNEYS

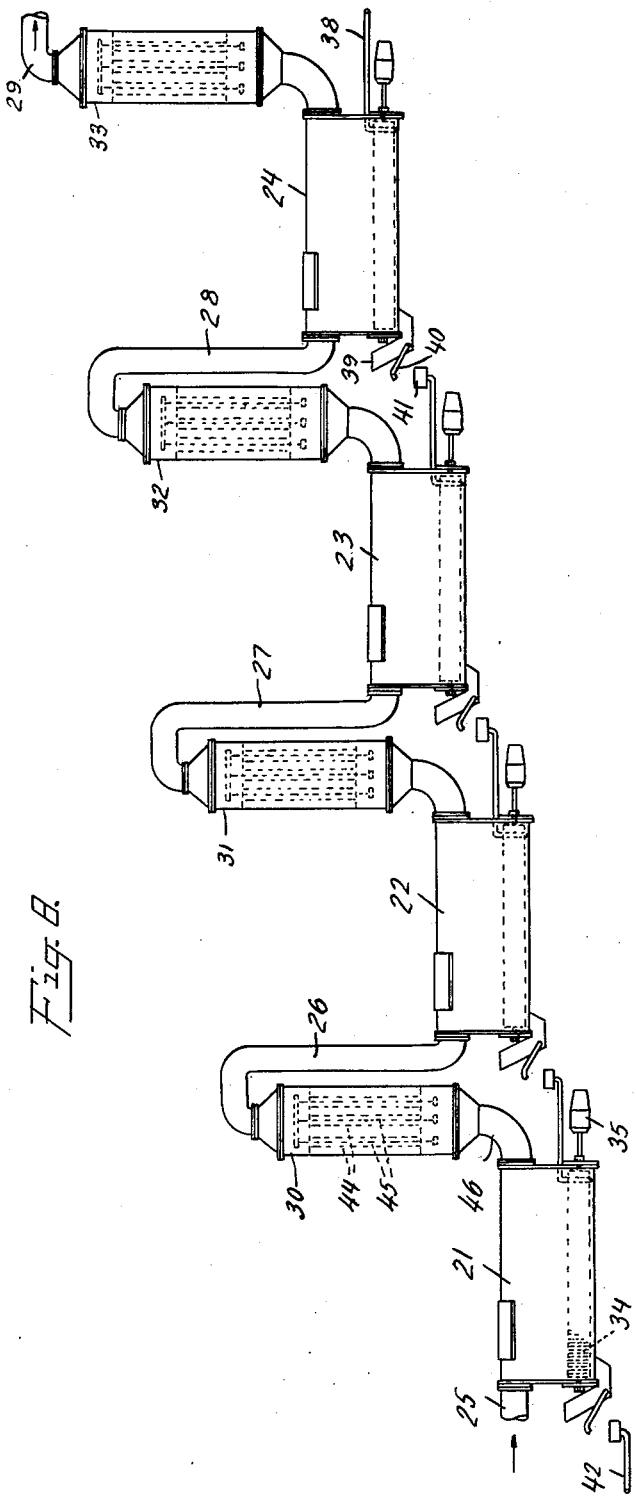

Patented May 15, 1934

1,958,586

UNITED STATES PATENT OFFICE 1,958,586

METHOD OF DISSOLVING AND APPARATUS THEREFOR

Stuart Parmelee Miller, Englewood, N. J., assignor to The Barrett Company, New York, N. Y., a corporation of New Jersey Application July 23, 1930, Serial No. 470,135

2 Claims. (Cl. 183—121)

This invention relates to an improved method of dissolving a gas or vapor from homogeneous admixture with other gases or vapors or a homogeneous mixture of gases and vapors by means of a liquid solvent. The invention includes both the method and apparatus. The method is designed more particularly for the solution of constituents present in a gas, etc. in a small amount, for example, a few percent by volume, and is particularly designed for the removal of such constituents as ammonia and light oil from coal distillation gases, etc.

According to this invention, ammonia or light oil or other constituent admixed with a large amount of other gases or vapors or a mixture of gases and vapors is dissolved out by a liquid in a series of steps and in each step substantial equilibrium is established between the constituent to be dissolved which is in gas or vapor form in the carrying medium, and that which has been dissolved in the solvent. The carrying medium and the solvent flow generally countercurrent to each other.

The expression "gaseous carrying medium" is used in the specification and claims to refer to a gas or vapor or a mixture of gas and vapor, from admixture with which the ammonia, light oil, or other gas or vapor is to be dissolved by the liquid solvent.

At each stage of the process the solvent is sprayed into the carrying medium in the form of a fine intense spray produced by rapidly rotating mechanical means which act upon a body of the solvent in which some of the desired constituent may be already dissolved and which is maintained in the absorption chamber at each stage of the operation. According to a preferred method of carrying out the invention the spray is produced by rapidly rotating a cylindrical roll about a horizontal axis, the roll being in surface contact with a small body of the solvent in each absorption chamber in which some of the desired constituent may already be dissolved. The roll dips into the liquid to only a slight extent and it is rotated at such high speed that a fine intense spray is produced which fills substantially the whole of the chamber in which the step of the dissolving process is being carried out. The rate of flow of the carrying medium and the solvent are so regulated that substantial equilibrium is established between the solvent and the carrying medium at each stage of the process. The process comprises two or more such dissolving steps. An important object of the invention is to prevent reversal of the flow of the solution either by reversal of the stream of liquid flowing from one compartment of the absorber to another, which might be caused by surging of the liquid which is common with a spray roll of the type here employed, or by return of particles of spray from one compartment to a preceding compartment by entrainment in the gaseous carrying medium which flows in a direction opposite to the desired flow of the solvent. Any considerable reversal of flow will decrease the high percentage absorption from the gaseous carrying medium which this invention is designed to effect.

The process is carried out in a plurality of connected chambers or compartments with countercurrent flow of the solution and the gaseous carrying medium through the chambers or compartments. A separate spray roll may be provided in each compartment or a single spray roll may serve to produce the spray in two or more compartments. According to a preferred arrangement, three or more compartments are constructed into a multi-compartment unit with one spray roll to produce the spray in each compartment. A single cylindrical roll may pass through all the compartments for this purpose or a compound roll may be employed with a single shaft running through all the compartments and a separate cylindrical roll affixed to the shaft in each compartment. Two or more such multi-compartment absorbers may be used in series or in parallel to obtain the results desired.

The spray rolls may be cylinders with smooth surfaces or they may have surfaces which are corrugated or fluted or otherwise modified in any desired manner. A cylindrical roll made up of a plurality of disks placed in close proximity to one another along a horizontal shaft has given good results as a spray roll. Any cylindrical roll of this type which operates on a horizontal axis and which throws a fine intense spray if allowed to dip to a slight extent in a body of the liquid and rotated at a high rate of speed, may be employed. Where there is a substantial difference in the liquid levels in the various compartments conical rolls rotating on a tilted axis may be employed.

Each compartment is advantageously so designed that it will be substantially filled by the spray thrown from the roll in that compartment. The roll may be located in a horizontal position parallel to the flow of the gases through the compartment or it may be located with its axis horizontal and perpendicular to the flow of the gases. Rotating the roll in a position parallel to the flow of the gases is desirable since in this case any average small unit of the liquid passes continuously in one direction through the compartment from one end to the other and is sprayed and resprayed into the gases during its flow through the compartment in a generally spiral course except as baffling or surging of the liquid, etc. tends to prevent such continuous progression.

Each compartment is advantageously so designed that the spray thrown from the roll fills the entire compartment and does not leave "gas pockets" within the chamber which the spray does not reach. A spray roll operated at high speed, for example 900-1200 R. P. M. which is allowed to dip to only a slight extent into the liquid, may throw a spray several feet and the spray chambers may measure several feet in each direction.

Each chamber may be provided with baffles to insure a circuitous flow of the gaseous carrying medium through the chamber. These baffles are advantageously of a type that will not produce an undesirable drop of pressure in the gases in flowing through the chambers. Any considerable drop in pressure would not only necessitate high power consumption for operation, but would also tend to produce a different liquid level in each chamber; this would make it impossible to use a single spray roll of uniform diameter in a plurality of interconnected chambers without additional means, such as pumps or the like to counteract this tendency.

The flow of the gaseous carrying medium through the compartments is continuous and ordinarily this flow through the compartments will be at a substantially uniform rate. Similarly the flow of liquid solvent through the compartments is continuous and a uniform rate of flow is desirable. Surging of the liquid ordinarily accompanies the use of a spray roll of the type herein described. Where the liquid from one compartment is fed directly to another compartment, it is desirable to provide means to prevent surging of the liquid in the compartments and more particularly to prevent surging from one compartment to the next and then back to the first compartment again. Baffles may be provided to minimize surging within the compartments and surging between the compartments may also thus be minimized or prevented. According to a preferred arrangement wells are provided around the liquid inlets and outlets connecting the compartments. As an alternative, reservoirs, preferably baffled reservoirs, may be provided in the liquid connections between the compartments to prevent any appreciable reversal in the direction of flow of the liquid. Baffles on the floor of one or more of the compartments may be provided to prevent surging of the liquid.

According to this invention means is provided to remove entrained particles of spray from the gaseous carrying medium in passing from one compartment to the next so that the gas as it enters each compartment is substantially free from liquid particles. The gaseous carrying medium passes through the compartments in the direction opposite to the flow of liquid and therefore transfer of any liquid from one compartment to the next by the gas is undesirable. Any considerable transfer of liquid between the compartments by entrainment in the gases will materially interfere with the efficiency of the operation. To prevent such transfer of liquid by entrainment in the gases suitable means such as baffles are provided to remove the entrained liquid particles between the compartments. In small installations baffles in the gas passages connecting the compartments may satisfactorily be employed for removing entrained spray particles from the gaseous carrying medium, and in larger installations, baffle towers filled with grids, etc. or electrical precipitators or the like may be used. The liquid removed from entrainment in the gases as fine particles of spray is advantageously returned to the compartment in which it was formed into spray. The gases enter the next adjoining compartment substantially free from entrained liquid.

The choice of the liquid solvent, the temperature at which the solvent and gaseous carrying medium are introduced into the series of chambers, the rate of flow of the gases and the solvent, etc., may be varied with the nature of the constituent to be dissolved, the nature of the gaseous carrying medium and the degree of removal and the concentration of the constituent in the solvent required. Where the constituent dissolves rapidly in the liquid solvent or a low concentration in the solvent is desired, the gases may pass through the compartments at a high rate of speed. Where the constituent present in the gaseous carrying medium is not so rapidly dissolved by the solvent or a solution of higher concentration is desired, a lower rate of gas flow will be required in order to allow the liquid and gases in each compartment to come to substantial equilibrium and the rate of flow of the solvent may be varied also. Complete or substantially complete removal of a constituent will ordinarily require a slower rate of flow than fractional removal. Variation in the rate of flow thru the compartments may be provided by employing one or more compartments of relatively greater cross section or length. Where the constituent to be dissolved is not rapidly dissolved by the solvent, a larger number of compartments may advantageously be employed. In general, three or four or sometimes as many as six to eight compartments will be employed where substantially complete removal of a constituent from a gaseous carrying medium is required.

Where heating or cooling of the solvent or gaseous carrying medium to offset any heat of solution or to raise or lower the temperature of the solvent or carrying medium to control the absorption process is desired, suitable jackets or internal coils, etc., may be provided at the proper stage of the process for the circulation of a heating or cooling medium. If desired, the apparatus may be insulated.

The invention is particularly designed for the removal of light oil and of ammonia in the form of ammonia liquor from coal distillation gases. In removing ammonia, for example, from the gases the gases will be passed through a plurality of compartments countercurrent to water and in each compartment the gases will be sprayed with a fine intense spray of the water or ammonia liquor formed by solution of the ammonia in the water. Coal distillation gases ordinarily enter an ammonia absorber at from 30-40° C. or thereabouts. Coal distillation gases at this temperature may be passed through a series of three or four spray roll compartments at a high rate of speed with substantially complete removal of the ammonia from the gases in the compartments, if the gases are sprayed with sufficient water in each compartment in the efficient manner provided by this invention.

Light oil, i. e. a mixture of benzol and toluol, etc., may be dissolved from coal distillation gases by passing them through a series of three or four or more spray roll compartments, passing straw oil or other suitable solvent through the compartments in the opposite direction, and producing an intense spray of the solvent in each compartment as provided by this invention. Straw oil does not absorb light oil as readily as water absorbs ammonia at the respective temperatures at which light oil and ammonia are ordinarily absorbed from coal distillation gases and in constructing a plant where both the light oil and ammonia are to be recovered in absorbers of this type, this must be taken into consideration.

The invention will be further described in connection with the accompanying drawings but it is intended and is to be understood that it is not limited thereto.

The drawings show a preferred form of multi-compartment absorber for the removal of benzol or ammonia from coal distillation gases, etc. which comprises a three compartment absorber with baffles between adjacent compartments and a single horizontal spray roll passing through all of the three compartments, and also a plant for handling a larger volume of gases, drawn to a smaller scale, in which electrical precipitators are shown for removing entrained spray particles from the gases passing between the several compartments of the absorber.

Fig. 1 is a plan view of the preferred form of apparatus with the cover removed;

Fig. 2 is a section on the line 2—2 of Fig. 1;

Fig. 3 is a section on the line 3—3 of Fig. 1;

Fig. 4 is an enlarged view of the baffles or entrainment remover shown in Figs. 1–3;

Fig. 5 is a section on the line 5—5 of Fig. 4;

Fig. 6 is a section on the line 6—6 of Fig. 4;

Fig. 7 is a section of a modified form of entrainment remover; and

Fig. 8 shows an alternative form of apparatus using electrical precipitators.

The spray box of Figs. 1–6 comprises three compartments 1, 2 and 3. The spray roll 5 is common to all three compartments. It passes through the dividing walls 6 and 7 which separate the compartments 1 and 2 and 2 and 3, respectively. The gas to be treated, for instance coal distillation gases containing for example up to one or one-and-one-half percent ammonia, enters through the gas inlet 8. These gases pass through the compartments 1, 2 and 3 in succession and then through the outlet 9 for treatment in a light oil absorber, etc. The light oil absorber may be a spray roll absorber of the same type as that here shown for the removal of ammonia. The gases enter the ammonia absorber at a temperature of, for example, 35–40° C. In each compartment the gases are sprayed with water or ammonia liquor formed by the solution of ammonia in the water, and the gases are progressively cooled. The solubility of the ammonia in the water increases as the temperature of the gases decreases. Where the percentage of removal of the ammonia from the gases in a three-compartment absorber is not sufficiently complete, a larger number of compartments may be employed.

Substantial equilibrium is brought about in each compartment between the gaseous ammonia and the ammonia in solution. The water enters through the inlet 10 in compartment 3. The ammonia concentration in this compartment is low. In compartment 1 the ammonia concentration is high. The ammonia liquor produced is drawn off through the outlet 11.

An approximate picture of the mechanism of the process may be obtained by assuming, for example, that the coefficient of distribution of the constituent to be dissolved, between the gas and the solvent is 1:80, and that in each compartment 80% of the constituent will be removed when equilibrium is obtained. The concentration of the constituent in the gas entering compartment 2 will then be approximately 20% of the concentration in the gas entering compartment 1. Furthermore, the concentration in the gas entering compartment 3 will be approximately 4% of the concentration in the gas entering compartment 1. The concentration in the gas escaping through the outlet 9 will be but eight-tenths of a percent. Over ninety-nine percent of the constituent in the entering gases will be removed by passage through the three compartments under these conditions. If the coefficient of distribution is less than 1:80, the percent removed with three compartments will be less. A larger number of compartments can be employed to remove a higher percentage.

In the drawings, a smooth roll is shown for producing the spray. The spray roll passes through the partitions 6 and 7 by means of suitable packing indicated at 12. The roll is driven by the motor 13 at a high rate of speed, e. g. 900–1200 R. P. M. A fine intense spray is produced which will fill a chamber with a cross-section measuring several feet in each direction. The drawings show a chamber about three feet by three and a half feet and five feet long with a spray roll 10 inches in diameter. The size of the apparatus may be varied as required. Two or more units of approximately this capacity or apparatus of much larger dimensions may be used when handling increased volumes of gas. The spray roll may be rotated in either direction although rotation in the direction indicated by the arrow in Fig. 2 gives better results in a chamber of the type shown than when the roll is rotated in the opposite direction.

The liquid passes from compartment 3 to compartment 2 and then from compartment 2 to compartment 1 by the liquor pipes 14.

A liquor well 15 is formed in each compartment around the inlets and outlets of the liquor pipes connecting the compartments. The wells remain full of liquor, thus provide a constant hydraulic head at each end of the pipes 14, and provide a small reservoir of liquor which tends to prevent reversal in the direction of flow of the liquor from one compartment to the next. If no liquor wells were provided surging of the liquor from one end of a compartment to the other would tend to prevent uniform flow of the liquor through the compartments by means of the liquor pipes 14 and the liquor which had passed from compartment 3 to compartment 2 or the liquor which had passed from compartment 2 to compartment 1 might be forced back into compartment 3 or compartment 2, respectively, by this surging. Such return of liquor which had already been brought into equilibrium with a gas of higher ammonia concentration to a compartment in which a lower concentration of ammonia in the gases is being maintained is undesirable and lowers the efficiency of a countercurrent operation such as that described.

The gases flow countercurrent to the liquor and pass from one compartment to the next through baffles or entrainment removers 16. The slotted plate baffles employed for this purpose are shown somewhat in detail in Figs. 4 to 6. The gases in passing from one compartment to the next pass through the slots and entrained particles of liquid impinge at least to some extent on the plates 17. Liquid which is thus removed from the gases drains down the plates and is returned to the body of liquor. The efficiency of such an entrainment remover depends upon the number of rows of plates, the nearness of the plates to one another and upon the rate of passage of the gases through the chamber. With a higher rate of travel of the gases the plates may be placed somewhat further apart than with gases travelling at a lower rate. Entrainment removers of this type are not efficient with gases travelling at too low velocities. This particular design of entrainment remover is desirable with gases flowing at sufficiently high velocities since it is quite efficient and impedes the flow of the gases to no substantial extent.

Liquid removed from the gases by impinging on plates 17 flows down these plates, eventually into the body of the liquid in the spray box. The horizontal baffle plate 18 diverts part of this liquid into one chamber and the balance into the other chamber adjacent to the baffle.

Fig. 7 shows a modified type of entrainment remover in which the base board 18' slopes sufficiently to provide for return of the recovered liquid to the chamber which the gases are leaving. The arrow indicates the direction of flow of the gases.

Various arrangements for removal of entrained liquor may be employed. The arrangement of baffles shown in Figs. 1-6 is simple and efficient and is particularly desirable since it offers no considerable hindrance to the flow of the gases. The power consumption of the exhausters is therefore low and substantially the same liquor head is maintained in each compartment. The baffles of the entrainment remover of the type described are advantageously set at right angles to the spray roll so that the spray is thrown across the baffles and not at right angles to them. This tends to prevent passage of the spray from one chamber to the next by entrainment in the gases, to a greater extent than if the spray is thrown directly against the baffles.

An ammonia absorber of the type and size here described has been successfully employed and with removal of over ninety percent of the ammonia from gases with an original ammonia content as low as about one-third of a percent.

In removing benzol from coal distillation gases apparatus of the same type may be employed. The size of the apparatus will be varied to accommodate the volume of the gases being treated, the concentration of benzol in the solvent desired, whether complete removal of benzol from the gases is required, etc., and the rate of flow of the gases may be increased or decreased as required.

Although the entrainment baffle shown is sufficient for removal of the liquid between compartments it may be desirable to employ apparatus which will effect more nearly complete removal of the spray from the exit gases leaving the final compartment, especially where the spray, or any constituent of the spray, is of any great value. For this purpose a small tower filled with grids and sprayed with liquid of the same composition as the spray may be employed to advantage. The liquid may be introduced into the absorber by spraying into such an entrainment remover and then delivering it to the last compartment through which the gases pass. Any other suitable apparatus, such as a baffled settling tower, an electrical precipitator, etc. may be employed for the removal of spray from these final exit gases.

Fig. 8 shows a modified form of apparatus in which electrical precipitators are employed for removing entrained particles from the gases or vapors as they pass from one chamber to another and in which an electrical precipitator is employed for removing entrained spray particles from the gases as they leave the system. The liquid removed from the gases flows back down thru the gas passage and is returned to the chamber in which the spray is produced. This type of apparatus is particularly advantageous in treating large volumes of a gaseous medium.

Four absorption chambers are indicated at 21, 22, 23 and 24. The gaseous carrying medium enters the system at 25. It passes from the chamber 21 to the chamber 22 thru the pipe connection 26, from the chamber 22 to 23 thru 27, from the chamber 23 to 24 thru 28, and leaves the system thru the pipe 29. In the connections 26, 27 and 28 are electrical precipitators indicated by 30, 31 and 32, respectively. The precipitator 33 is provided to remove entrained particles from the gases leaving the system thru the pipe 29.

In each of the chambers 21, 22, 23 and 24 is a horizontal spray roll 34. These spray rolls are shown as corrugated rolls, formed by mounting a plurality of disks on a shaft in close proximity to one another. Smooth spray rolls may be used. The spray rolls are rotated by the motors 35 at a high rate of speed. The solvent enters the system thru the pipe 38 and is thrown up into the gases or vapors in the chamber 24 in the form of a fine intense spray and dissolves from the gases or vapors the ammonia or benzol or other solute present therein. The resulting solution is drawn off from the chamber 24 thru the discharge box 39 and the adjustable levelling arm 40. The position of this arm controls the height of the liquid maintained in the chamber 24. The liquid discharged thru the levelling arm is caught in the cup 41 and fed into the chamber 23. In a similar manner the liquid is withdrawn from the chamber 23 and fed into the chamber 22 and then into the chamber 21 in succession. With draw-offs of this type uni-directional flow thru the chambers is assured and it is impossible for the liquid which has flowed from one chamber into another to be returned to the chamber from which it has flowed because of surging or for any other cause. The rate of flow of the solvent and the gaseous medium may be controlled to produce a desired concentration of solute in the solvent drawn off from the chamber 21 thru the arm 42.

With apparatus of this type there is no transfer of liquid from one chamber to another by entrainment in the gases. The gases leaving the chamber 21, for example, enter the precipitator 30 and are subjected to an electrical discharge therein. The gases pass up thru the tubes 44 in the precipitator. The electrical discharge from the rods 45 which are suspended in these tubes causes entrained particles of liquid to be deposited on to the tubes and the liquid flows down thru the tubes and back thru the outlet pipe 46 into the chamber 21 and it blends with the body of liquid therein. In a similar manner entrained particles of liquid carried from the chamber 22 are returned thereto and entrained particles carried from the chamber 23 are returned thereto. The precipitator 33 may be omitted where the spray is of little value and any spray carried suspended in the gas may be dissipated in the atmosphere, or otherwise disposed of. Where gas oil or other valuable solvent is employed, it is desirable to collect the solvent entrained in the gases leaving the system by means of a precipitator or baffling tower, etc.

By countercurrent flow of the solvent and gaseous medium and provision of means for producing substantial equilibrium at each stage of the absorption process, and removal of entrained solvent from the gases and provision for uni-directional flow of the liquid from one chamber to the next without reversal in the direction of the flow of the liquid substantial equilibrium between the solute in the carrying medium and the solute in the solvent is established in each chamber. By carrying out the absorption process in a series of successive steps with countercurrent flow of the solvent and gaseous carrying medium as here described the solute is efficiently removed from the carrying medium.

The apparatus may be employed for other uses but is particularly designed for the removal of a gas or vapor from a gaseous carrying medium in which it is present in only small concentration.

I claim:

1. The method of removing a soluble constituent from a gaseous carrying medium by solution in a liquid solvent, which comprises passing the gaseous carrying medium and the liquid solvent thru a plurality of absorption compartments in series, passing the carrying medium continuously thru the series of compartments in one direction and passing the solvent thru the series of compartments in the opposite direction, maintaining a substantially constant level of the solvent in each compartment, maintaining in substantially the entire gas space of each compartment such a fine intense spray of solvent as to establish in each compartment substantial equilibrium between the soluble constituent in the carrying medium and in the solvent by rapidly rotating a horizontal cylindrical spray roll in contact with the body of solvent in each compartment, maintaining uni-directional flow of the solvent from one compartment to the next in series and removing entrained particles of solvent from the carrying medium after spraying it in one compartment and before spraying it in the next so as to prevent transfer of any substantial amount of the solvent from one compartment to another by entrainment in the carrying medium.

2. An absorber comprising an elongated chamber having a gas inlet at one end thereof and a gas outlet at the other end thereof, a rotatable spray member of substantially circular cross section the axis of said member extending substantially the length of said chamber, said member being near to but spaced from the bottom of the chamber, a plurality of substantially vertical partitions extending upwardly from the floor of said chamber and having apertures therein for the passage of said circular member therethrough, said partitions being arranged so as to divide said chamber into a plurality of compartments, a liquid conduit located near the bottom of said chamber and arranged to conduct liquid from a compartment to the next adjacent compartment, a plurality of baffles extending vertically from said partitions to the top of said chamber said baffles extending substantially the width of said chamber, arranged substantially perpendicular to the axis of said rotatable spray member and having a series of small openings therethrough and being arranged so that gases passing through said chamber from said gas inlet to said gas outlet must pass through said openings, the openings being arranged along the baffle members so that a substantially uniform flow of gas through the chamber is obtained, a liquid inlet at the gas outlet end of said chamber and a liquid outlet at the gas inlet end of said chamber, and means for rotating said circular member at a high rate of speed.

S. P. MILLER.